United States Patent [19]
Jackson

[11] 4,453,308
[45] Jun. 12, 1984

[54] MACHINE FOR ASSEMBLING FASTENER BLANKS WITH WASHERS

[75] Inventor: Warren M. Jackson, Rockford, Ill.

[73] Assignee: Warren M. Jackson, Inc., Rockford, Ill.

[21] Appl. No.: 379,332

[22] Filed: May 18, 1982

[51] Int. Cl.³ ............................................. B23P 19/08
[52] U.S. Cl. .................................. 29/785; 10/155 A; 10/169; 29/786
[58] Field of Search ............ 10/155 R, 155 A, 162 R, 10/169; 29/783, 785, 786, 792, 793, 794

[56] References Cited

U.S. PATENT DOCUMENTS

| | | | |
|---|---|---|---|
| 2,273,782 | 2/1942 | Irwin | 10/155 A |
| 2,711,550 | 6/1955 | Nielsen | 10/155 A |
| 2,714,214 | 8/1955 | Stern | 10/155 A |
| 2,728,092 | 12/1955 | Poupitch | 10/155 A |
| 2,792,578 | 5/1957 | Autio | 10/155 A |
| 2,927,333 | 3/1960 | Stern | 10/155 A |
| 3,165,232 | 1/1965 | Stern | 10/155 A |
| 3,622,039 | 11/1971 | Lindstrom | 10/155 A X |
| 3,654,650 | 4/1972 | Burgess et al. | 10/155 A |
| 3,750,206 | 8/1973 | Pomernacki | 10/155 A |
| 4,058,866 | 11/1977 | Foster | 10/155 A |

Primary Examiner—E. Michael Combs
Attorney, Agent, or Firm—Leydig, Voit, Osann, Mayer & Holt, Ltd.

[57] ABSTRACT

Washers are cascaded downwardly from a vibratory feeder into a reservoir which overlies a rotatable disc having a series of angularly spaced pockets. As the disc rotates, each pocket picks up a washer and carries the washer to an assembly station where a screw blank is telescoped into the washer, the screw blanks being delivered to and being carried by heads spaced angularly around a rotatable turret. A feeler senses the approximate quantity of washers in the reservoir and causes the vibratory feeder to be activated automatically when the supply of washers is low and to be de-activated when the supply is large. An arcuate shoe, an agitator, and a sensor also are provided for camming the washers into position to be received by the pockets, for agitating the washers in the supply, for ejecting excess washers from the pockets, for detecting the absence of washers in the pockets and for ejecting any washers which might not receive screw blanks, respectively.

5 Claims, 14 Drawing Figures

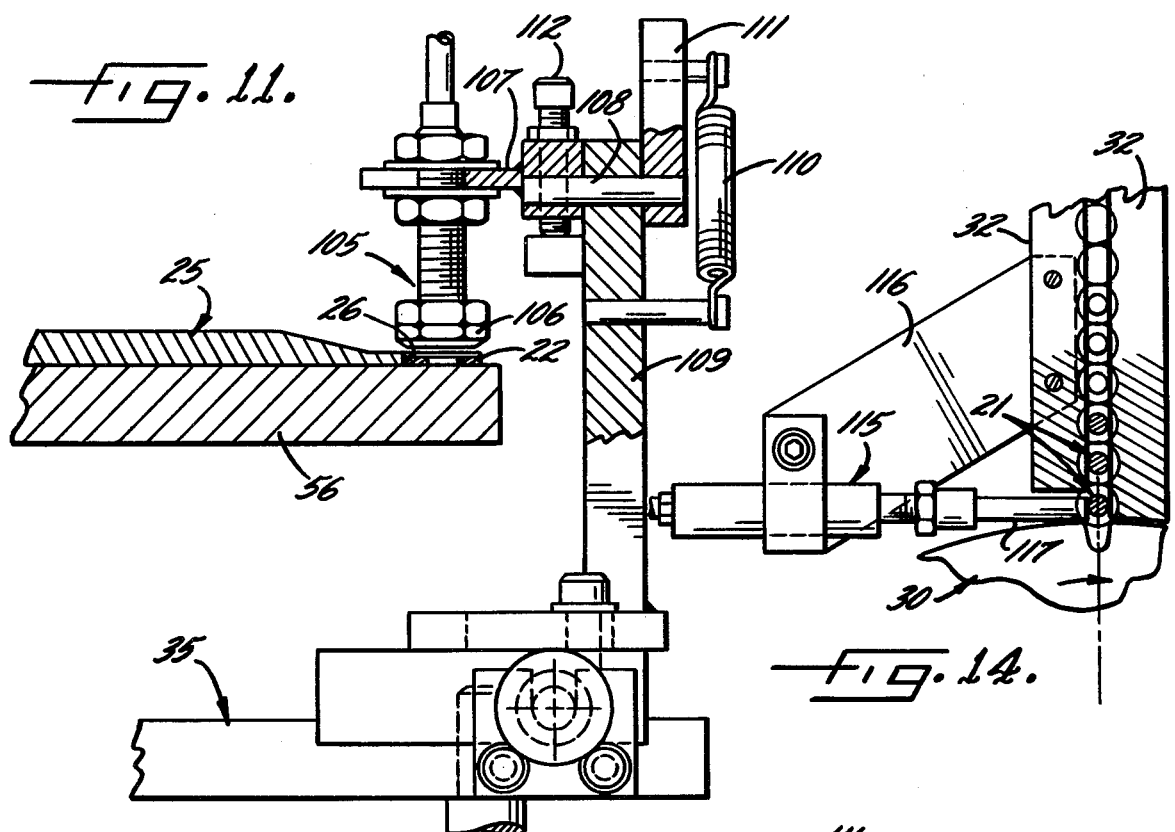
fig. 11.
fig. 14.
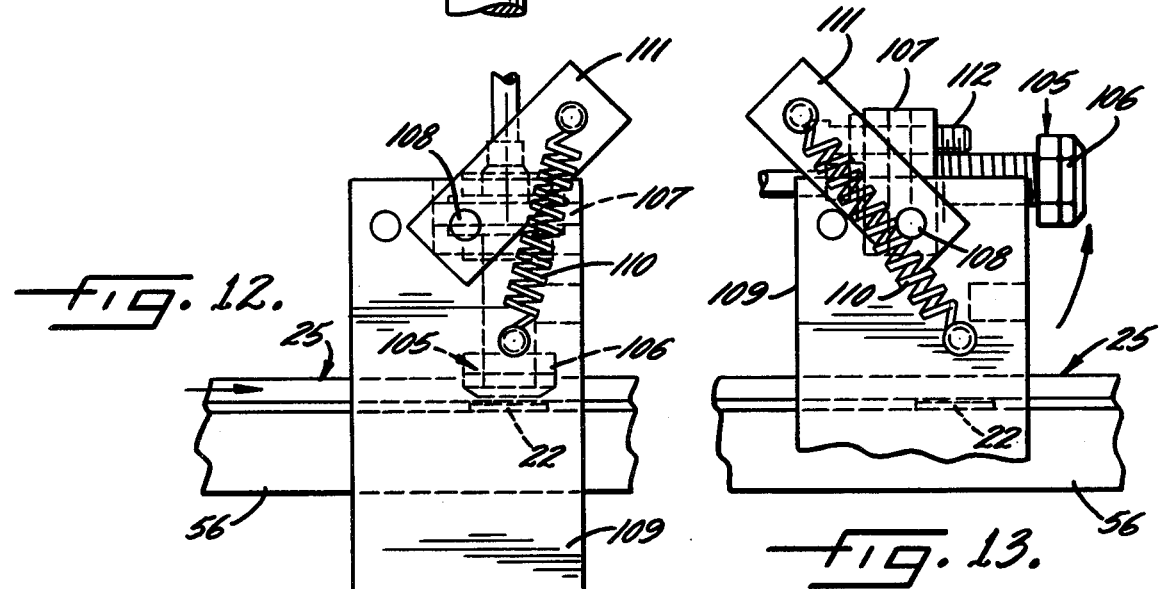
fig. 12.
fig. 13.

MACHINE FOR ASSEMBLING FASTENER BLANKS WITH WASHERS

BACKGROUND OF THE INVENTION

This invention relates generally to a machine for assembling male fastener blanks such as screw blanks with washers preparatory to forming threads on the blanks to captivate the washers thereon. More specifically, the machine relates to a screw blank/washer assembly machine of the same general type as disclosed in Pomernacki U.S. Pat. No. 3,750,206 and Foster U.S. Pat. No. 4,058,866.

In those machines, washers are cascaded downwardly from a vibratory feeder onto a rotatable disc having a series of pockets spaced angularly around its periphery. As the disc rotates, the pockets pick up the washers and carry the washers to an assembly station where a screw blank is telescoped into each washer. The screw blanks are fed to a rotatable turret which carriers the blanks to the assembly station and effects telescoping of the blanks into the washers. The assembled blanks and washers then are delivered to a thread rolling machine.

The vibratory feeder of a machine of the type disclosed in the Pomernacki and Foster patents floods the disc with washers and supplies the disc with a significantly greater number of washers than can be accommodated by the pockets in the disc. As a result, many unaccommodated washers spill off of the disc. The unaccommodated washers are collected by another vibratory feed system which conveys the washers back to the main vibratory feeder for re-delivery to the disc.

SUMMARY OF THE INVENTION

The general aim of the present invention is to provide a new and improved assembly machine of the foregoing type in which virtually all of the washers which are cascaded downwardly onto the rotatable disc are picked up by the pockets of the disc so as to avoid the presence of a large number of unaccommodated washers and to avoid the need for recycling washers to the vibratory feeder.

A further object of the invention is to achieve the foregoing by providing a machine in which the downwardly cascading washers are accumulated in a reservoir immediately above the disc and in which the approximate quantity of washers in the reservoir itself is continuously monitored. As the supply of washers in the reservoir diminishes, the vibratory feeder is started automatically to replenish the supply and then is automatically stopped so as to prevent too many washers from cascading onto the disc. In this way, the quantity of washers in the reservoir is maintained sufficiently large to fill all of the pockets and yet is kept sufficiently small to prevent a large number of washers from spilling off of the disc.

Another object of the invention is to provide a relatively simple and reliable detector for monitoring the supply of washers in the reservoir and for controlling the operation of the vibratory feeder.

The invention also resides in the provision of a unique cam element for facilitating placement of the washers in the pockets of the disc.

These and other objects and advantages of the invention will become more apparent from the following detailed description when taken in conjunction with the accompanying drawings.

BRIEF DESCRIPTION OF THE DRAWINGS

FIGS. 10, 11 and 12 are enlarged fragmentary cross-sections taken along the lines 10—10, 11—11 and 12—12, respectively, of FIG. 1.

FIG. 13 is a fragmentary view similar to FIG. 12 but shows certain parts in a moved position.

FIG. 14 is an enlarged top plan view, partly in section, of certain parts shown in FIG. 1.

DETAILED DESCRIPTION OF THE PREFERRED EMBODIMENT

Figure 3:
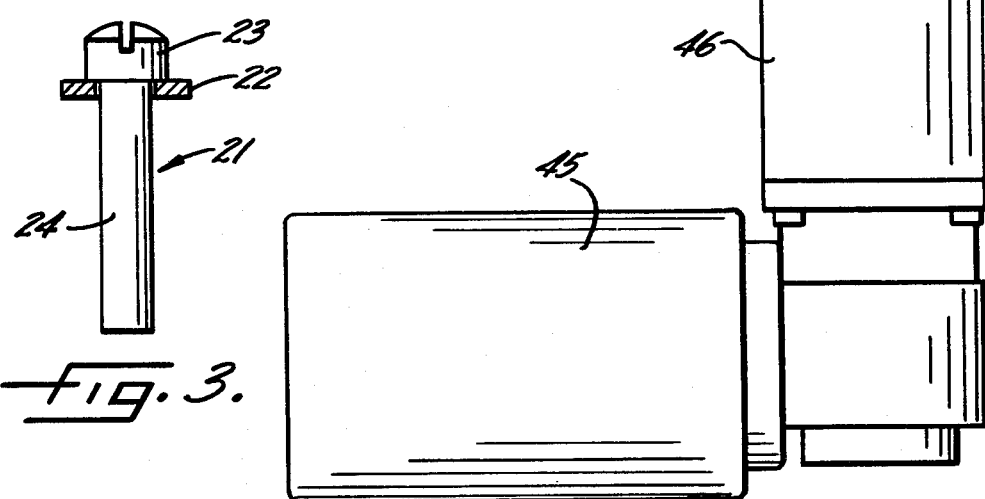
FIG. 3 is an elevational view of a typical screw blank assembled with a typcial washer, the washer being shown in section.

For purposes of illustration, the invention is shown in the drawings as incorporated in a machine 20 for automatically assembling a male fastener blank 21 with a washer 22. The fastener blank 21 which is shown in FIG. 3 is a screw blank having a head 23 and a shank 24. For purposes of simplicity, the washer 22 has been shown as being a conventional flat washer although it will be appreciated that the machine is capable of handling various types of washers such as internal and external star washers, belleville or conical washers, helical spring lock washers and square or round terminal type washers.

Figure 1:
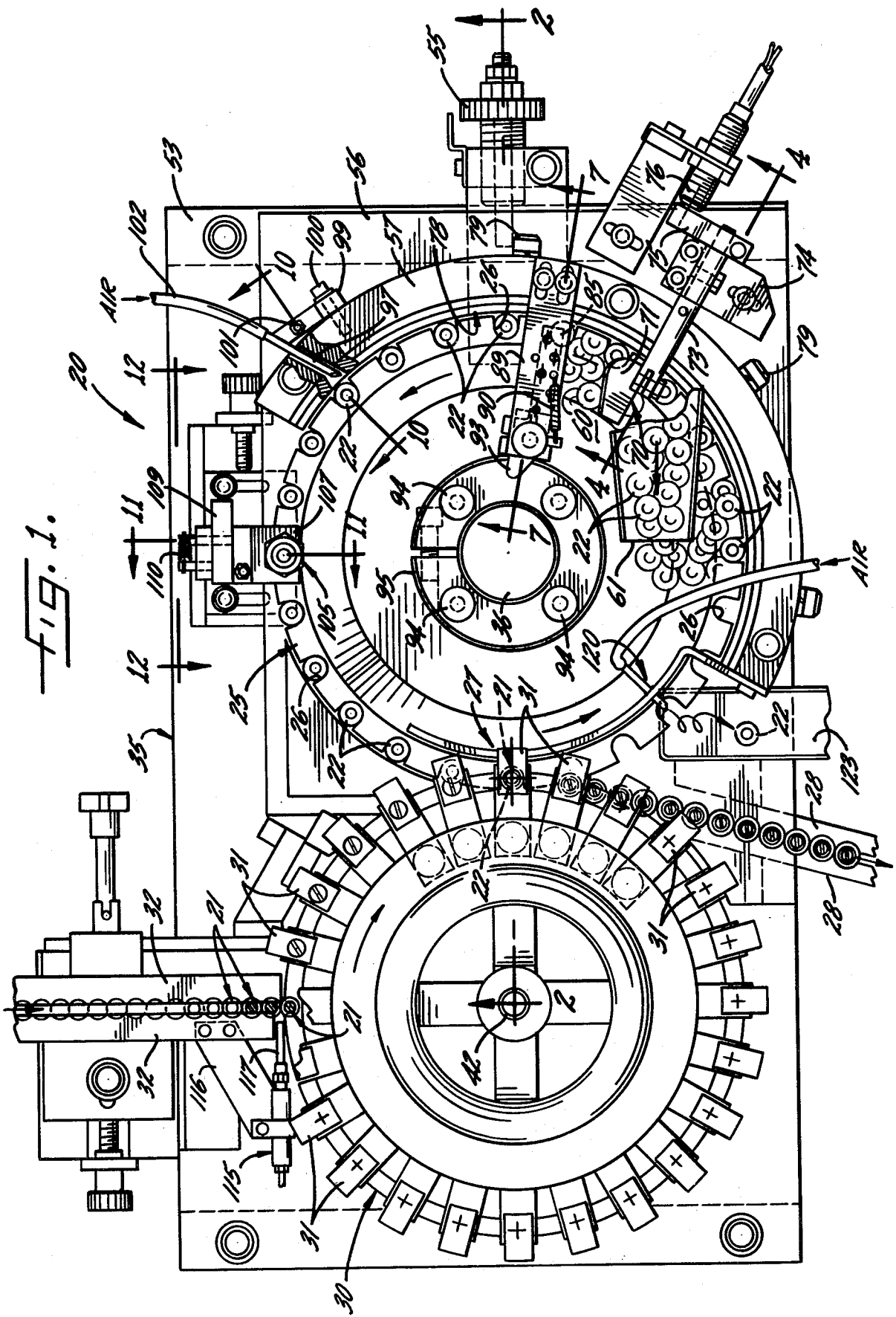
FIG. 1 is a fragmentary top plan view of a new and improved assembly machine incorporating the unique features of the present invention.
Figure 2:
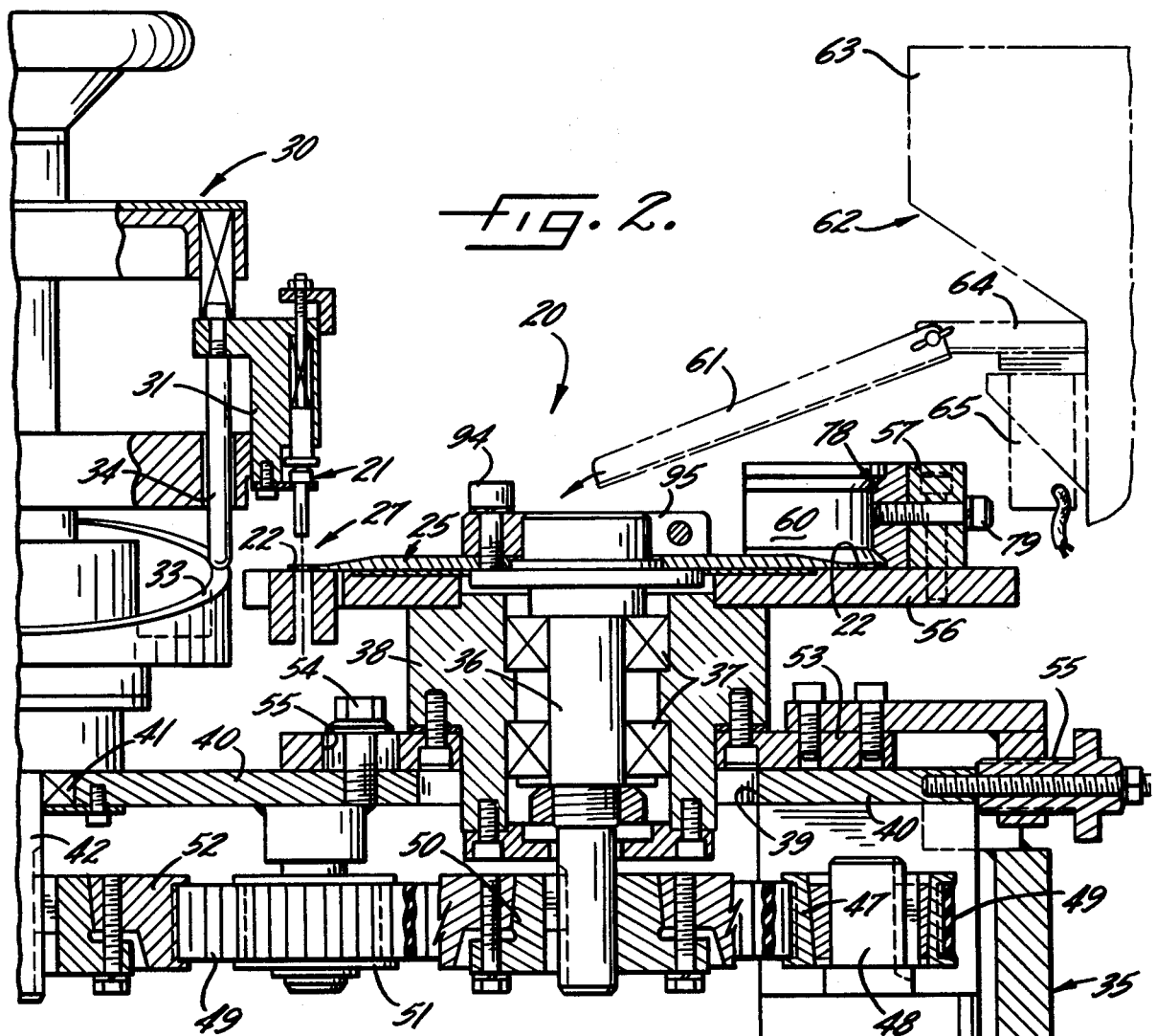
FIG. 2 is a fragmentary cross-section taken substantially along the line 2—2 of FIG. 1.

In many respects, the assembly machine 20 is similar to the machine disclosed in Foster U.S. Pat. No. 4,058,866. In general, the machine comprises a rotatable disc 25 having several (herein, twenty-four) angularly spaced notches or pockets 26 formed around its outer periphery. The disc is adapted to be rotated continuously and in a counterclockwise direction (FIG. 1) about an axis which is inclined forwardly at an acute angle relative to vertical. As the disc 25 rotates, each pocket 26 picks up a washer 22 and carries the washer around to an assembly station 27 (FIGS. 1 and 2). At the assembly station, a screw blank 21 is telescoped into each washer 22. The assembled blank and washer then are picked out of the pocket 26 and are directed between a pair of rails 28 (FIG. 1) which transfer the parts to a thread rolling machine (not shown). The latter rolls a thread on the shank 24 of the blank 21 with the thread serving to captivate the washer 22 against the head 23.

The screw blanks 21 are delivered to a turret 30 (FIGS. 1 and 2) having a series of angularly spaced heads 31, the present turret having twenty-four heads. The turret is adapted to be rotated continuously and in a clockwise direction about an axis spaced radially from and extending parallel to the axis of the disc 25. A screw blank normally is delivered to each head when the latter reaches the twelve o'clock position, the screw blanks being advanced one-by-one to the turret between a pair of rails 32 (FIGS. 1 and 14). Each head clamps the screw blank deliverd thereto and carries the blank to the assembly station 27 which, in this particular instance, is located approximately at a three o'clock position on the turret 30 and approximately at a nine o'clock position on the disc 25. When the screw blank reaches the assembly station, a stationary cam 33 (FIG. 2) located beneath the turret acts on a plunger 34 associated with each head 31 and causes the head to lower the screw blank into telescoping relation with the washer 22 in the assembly station. The head then releases the screw blank and shifts upwardly to permit the assembled blank and washer to proceed along the rails 28 to the thread rolling machine. Reference may be had to the aforementioned Foster patent for a more specific disclosure of the details of the construction and operation of the turret since those details per se do not constitute part of the present invention.

As shown in FIG. 2, the disc 25 is mounted on a main support or frame which has been designated in its entirety by the reference numeral 35. Specifically, the disc is fastened to the upper end portion of a shaft 36 which is journaled by bearings 37 in a hub 38. The hub extends through an enlarged hole 39 in a plate 40 which is rigid with the frame 35. A bearing 41 mounted in the plate 40 rotatably supports the lower end portion of a shaft 42 which defines the rotational axis of the turret 30.

To rotate the disc 25 and the turret 30, an electric motor 45 (FIG. 2) acts through a speed reducer 46 to rotate a cogged pulley 47 on the output shaft 48 of the speed reducer. A timing belt 49 having teeth on both sides is trained around the pulley 47, engages a cogged pulley 50 on the lower end of the disc shaft 36, extends past a cogged idler pulley 51 and is trained around a cogged pulley 52 on the lower end portion of the turret shaft 42. As a result, the disc and the turret are rotated in timed relation but in opposite directions.

The center-to-center spacing between the disc shaft 36 and the turret shaft 42 may be adjusted to enable the use of discs 25 of different diameter and with different pockets 26. For this purpose, the hub 38 is secured to a slide 53 (FIG. 2) which rests on the plate 40 and which normally is clamped to the plate by a screw 54 extending through an enlarged slot 55 in the slide and threaded into the plate. When the screw is loosened, the slide 53 may be shifted relative to the plate 40 by manually actuating an adjusting mechanism 55 which acts between the slide and the plate. Thus, the disc 25 may be moved radially toward or away from the turret 30.

Secured rigidly to the upper end of the hub 38 and underlying the disc 25 is a plate 56 (FIG. 2) which closes off the lower ends of the pockets 26 in the disc. An arcuate side wall 57 is secured to the upper side of the plate 56 and coacts with the disc 25 and the plate 56 to form a reservoir 60 for washers 22 delivered to the disc, the bottom of the reservoir being defined by the disc and the plate. As the disc rotates, the pockets 26 move beneath the supply of washers in the reservoir and pick up washers from such supply.

Washers 22 are cascaded downwardly onto the disc 25 and into the reservoir 60 from a downwardly inclined chute 61 (FIGS. 1 and 2). The chute is associated with a vibratory feeding unit 62 (FIG. 2) having a storage hopper 63 and having a tray 64 which is adapted to be vibrated to advance washers out of the hopper and into the chute. An electric motor 65 (shown schematically in FIG. 2) is operable when energized to vibrate the tray.

In accordance with one aspect of the present invention, the approximate quantity of washers 22 in the supply in the reservoir 60 is continuously monitored and, when the supply is reduced by virtue of washers being picked up by the pockets 26, the vibratory feeding unit 62 is automatically activated to cascade additional washers into the reservoir and replenish the supply. As soon as the supply has been sufficiently increased, the feeding unit is automatically deactivated to prevent the reservoir 60 from overflowing and to prevent any significant number of washers from spilling off of the disc 25. By controlling the feeding unit 62 directly in response to the depletion rate of the washers in the reservoir 60 itself, an adequate supply of washers is maintained to fill all of the pockets 26 and yet virtually all of the washers are retained on the disc 25. Accordingly, very few washers escape from the disc and thus there is no need to recirculate escaped washers to the feeding unit.

More specifically, the approximate quantity of washers 22 in the reservoir 60 is monitored by detecting means which herein include a feeler 70 (FIG. 1 and FIGS. 4 to 6) positioned in the reservoir 60 just downstream of the position where the chute 61 dumps the washers into the reservoir. The feeler comprises a generally horizontal foot 71 (FIGS. 4 to 6) extending at right angles to an upright leg 72 whose upper end is secured rigidly to the inner end portion of a generally horizontal shaft 73. The outer end portion of the shaft 73 is rotatably supported by the upper piece of a two-piece bracket 74 which is mounted on the plate 56 and whose upper piece may be adjusted upwardly or downwardly to change the elevation of the foot 71. The foot rests on top of the supply of washers 22 in the reservoir 60.

Carried on the outer end of the shaft 73 is a member in the form of a radially extending finger 75 (FIGS. 4 to 6) which is located adjacent a proximity sensor or switch 76 mounted on the plate 56. The proximity switch is connected into the control circuit for the motor 65 of the vibratory feeding unit 62.

Figure 5:
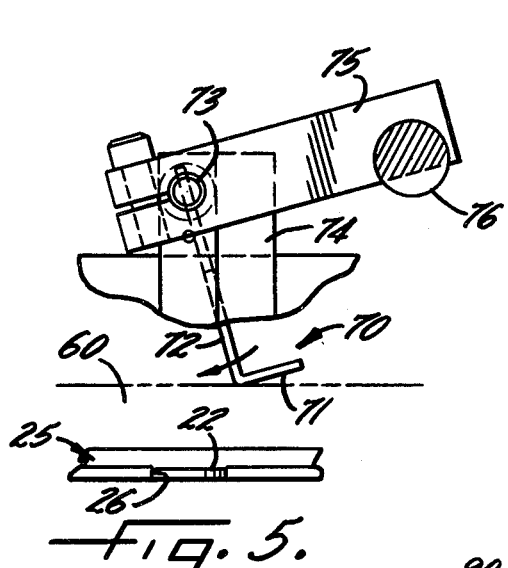
FIG. 5 is a fragmentary cross-section taken substantially along the line 5—5 of FIG. 4.
Figure 6:
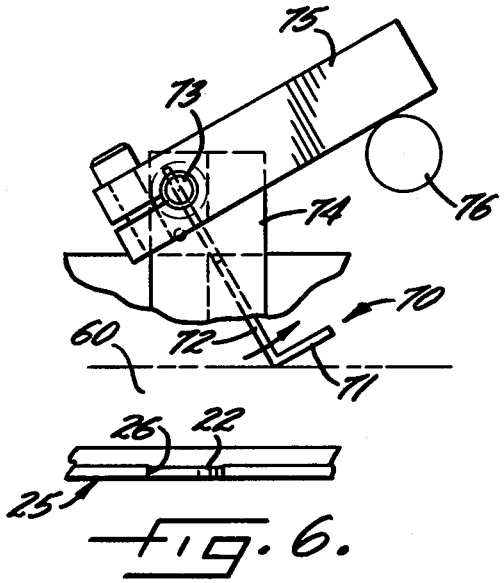
FIG. 6 is a view similar to FIG. 5 but shows certain parts in a moved position.

When the supply of washers 22 in the reservoir 60 is low, the feeler 70 drops under its own weight to the position shown in FIG. 5 and turns the shaft 73 to cause the finger 75 to sweep in front of the proximity switch 76. As a result, the switch produces a signal to energize the motor 65 and activate the feeding unit 62 to cause additional washers to cascade down the chute 61 and directly into the reservoir 60. Accordingly, the supply of washers in the reservoir increases in height and pushes the feeler 70 upwardly to turn the shaft 73 in the opposite direction. When the finger 75 swings upwardly to the position shown in FIG. 6, the proximity switch 76 no longer detects the finger and thus acts to de-energize the motor 65 and deactivate the feeding unit 62 to cut off the flow of washers to the reservoir 60.

With the foregoing arrangement, the feeding unit 62 is repeatedly activated and de-activated so as to keep a substantially constant supply of washers 22 in the reservoir 60 and to deliver washers to the reservoir on an "as needed" basis. Because the number of washers supplied to the reservoir in a given time interval is substantially equal to the number of washers picked up by the pockets 26 during that interval, there is virtually no spill over of the washers from the disc 25 and hence it is not necessary to recycle excess washers to the feeding unit 62.

Figure 7:
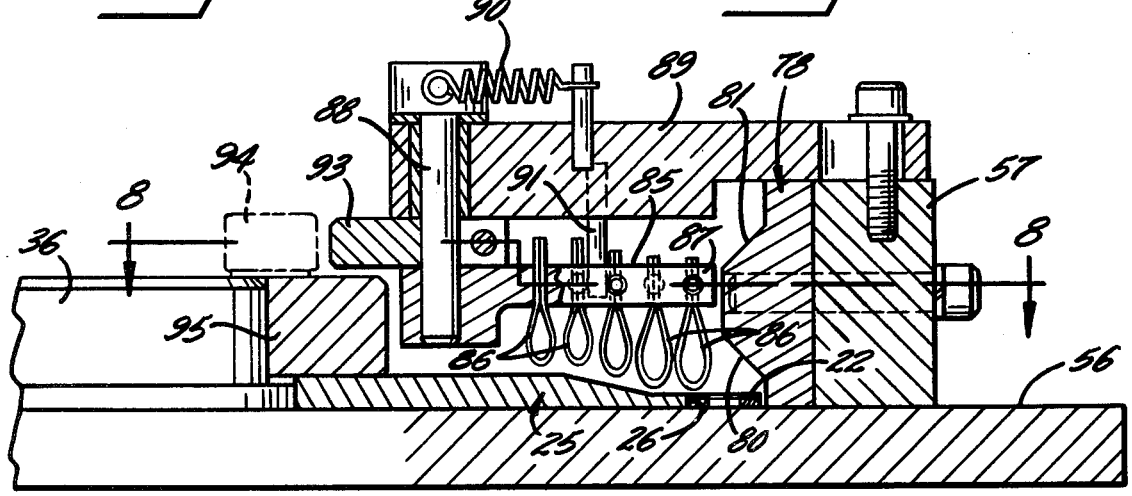
FIG. 7 is an enlarged fragmentary cross-section taken substantially along the line 7—7 of FIG. 1.
Figure 8:
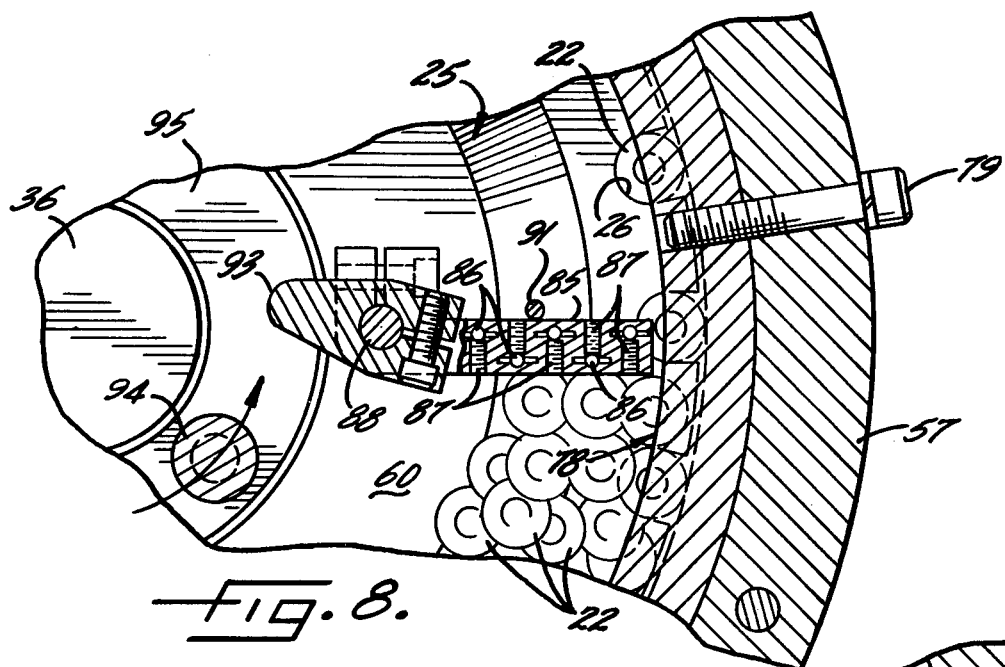
FIG. 8 is a fragmentary cross-section taken substantially along the line 8—8 of FIG. 7.
Figure 9:
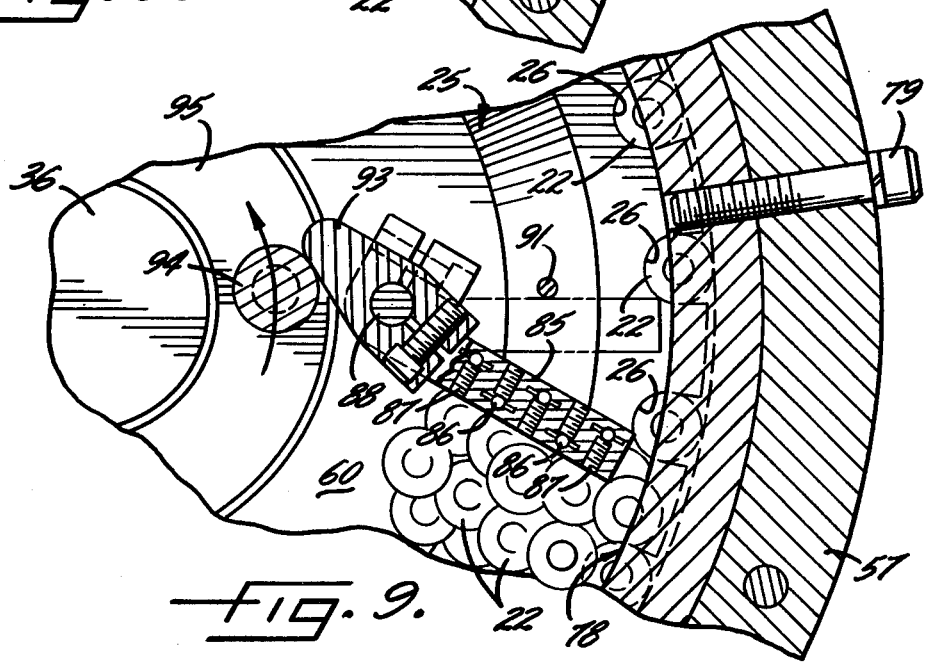
FIG. 9 is a view similar to FIG. 8 but shows certain parts in a moved position.

Provision is made of novel means for camming the washers 22 to generally horizontal positions to facilitate placement of the washers in the pockets 26 of the disc 25. Herein, these means comprise an arcuate shoe 78 (FIG. 4) which is detachably secured by screws 79 (FIGS. 1, 2 and 7) to the inner side of the side wall 57 of the reservoir 60. The lower end portion of the shoe is formed with a downwardly and outwardly inclined cam surface 80 (FIG. 4) which overhangs the outer peripheral surface of the disc 25, the cam surface being formed by grooving or chamfering the lower end portion of the shoe.

Figure 4:
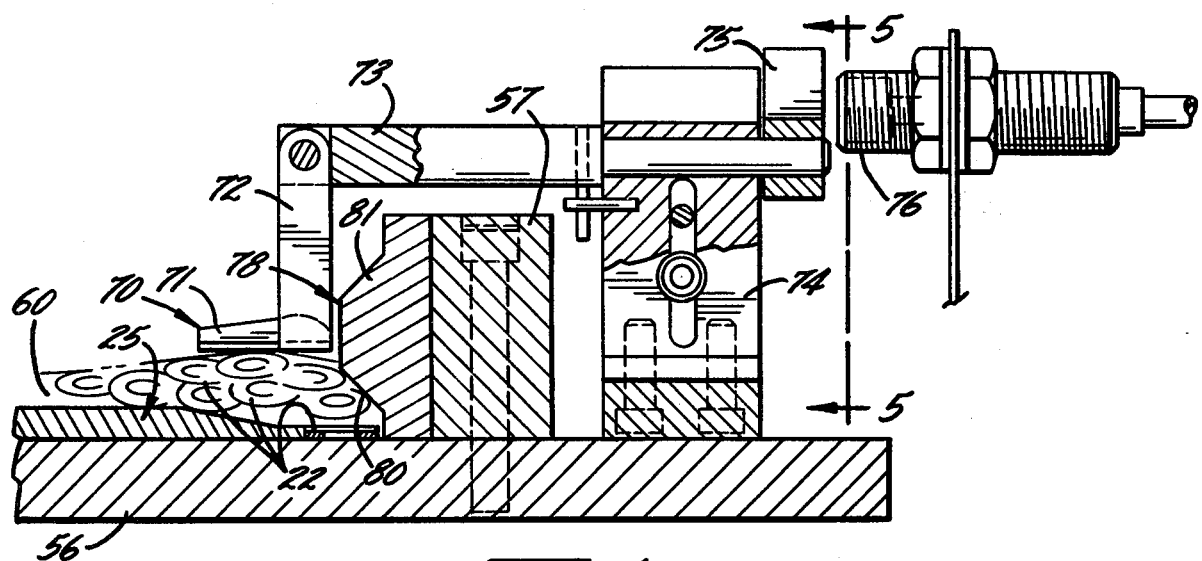
FIG. 4 is an enlarged fragmentary cross-section taken substantially along the line 4—4 of FIG. 1.

As the disc 25 rotates, any washers 22 which tend to stand in an upright position in the supply engage the inclined cam surface 80 and are pushed over so that the washers may fall into the pockets 26. Additionally, as shown in FIG. 4, the cam surface 80 shaves off the upper washers from a pile of washers over the pockets and prevents the washers from bunching up and failing to enter the pockets. Different types of washers may require different cam surfaces to facilitate effective placement of the washers in the pockets. Advantageously, an upwardly and outwardly inclined cam surface 81 (FIG. 4) is formed on the upper end portion of the shoe 78. By inverting the shoe, the cam surface 81 may be brought into active position to enable the machine 20 to effectively handle washers of a different type or size. Other shoes with still different cam surfaces may be used for other types of washers. If the machine is set up to run spring lock washers, the shoe 78 may be replaced with a shoe having a straight inner side located just outboard of the outer periphery of the disc 25.

Means also are provided for agitating the washers 22 in the reservoir 60 to prevent the washers from bunching up and clinging to one another and to promote quick placement of the washers in the pockets 26. In the present instance, the agitating means comprise an arm 85 (FIG. 1 and FIGS. 7 to 9) which overhangs the outer peripheral portion of the disc 25. A series of five agitating fingers 86 (FIG. 7) formed by spring wire loops depend from the arm and are secured detachably thereto by set screws 87.

The inner end portion of the arm 85 is fastened rigidly to the lower end portion of a pin 88 (FIG. 7) whose upper end portion is pivotally supported by a bracket 89 secured to the side wall 57 of the reservoir 60. A contractile spring 90 acts between the pin and the bracket and urges the agitating arm 85 and fingers 86 in a counterclockwise direction to a normal position shown in FIG. 8 in which the arm engages a stop 91 depending from the bracket 89. When the arm 85 is so positioned, the fingers 86 are located at the downstream end of the washer supply in the reservoir 60 and tend to act as gates to prevent the passage out of the supply of any washer which is not in a pocket 26.

Periodically, the arm 85 is swung about the axis of the pin 88 to cause the fingers 86 to sweep through the reservoir 60 in a direction opposite to the direction of rotation of the disc 25 and thereby agitate the washers 22 in the supply. For this purpose, an inwardly extending ear 93 (FIGS. 7 to 9) is secured rigidly to the pin 88 and projects into the path followed by four equally and angularly spaced lugs 94 which are secured to a collar 95 on the upper side of the disc 25. As the disc rotates, the lugs 94 successively engage the ear 93 and the cam the arm 85 clockwise to the position shown in FIG. 9 to cause the fingers 86 to sweep reversely through and agitate the washers 22. As each lug moves past the ear, the spring 90 returns the arm to its normal position shown in FIG. 8. As a result of the swinging arm 85 and fingers 86, the washers in the supply are periodically churned so as to shake loose any washers which might tend to bunch together.

Figure 10:
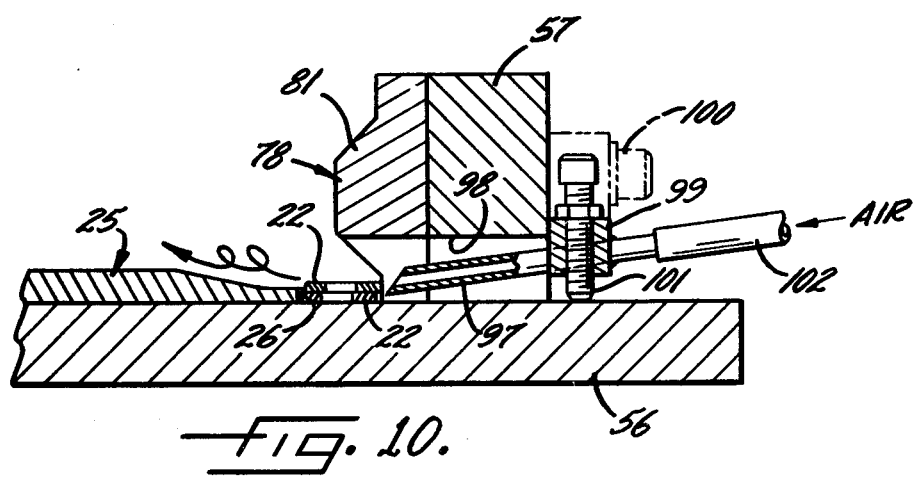

To insure against the possibility of two washers 22 being present in a given pocket 26 when the pocket arrives at the assembly station 27, a jet of pressurized air is directed across the disc 25 and serves to eject the uppermost washer from any pocket containing two washers. As shown in FIGS. 1 and 10, a nozzle 97 is positioned adjacent the outer periphery of the disc 25 at a location disposed between the agitator arm 85 and the assembly station 27. The nozzle extends into an opening 98 in the side wall 57 and the shoe 78 and is supported by a bracket 99 which is pivotally mounted on the side wall at 100. By adjusting a screw 101, the bracket 99 may be swung about the pivot 100 to adjust the elevation of the nozzle 97.

The nozzle 97 is located just above the top of a single washer 22 in a pocket 26 and communicates with a source of pressurized air by way of a line 102 (see FIG. 10). As the pockets move past the nozzle, the jet of pressurized air blows across the washers and, if any pocket contains two washers, the uppermost washer is ejected from the pocket and is directed inwardly over the disc 25 so that the washer may gravitate back to the reservoir 60. Accordingly, the nozzle 97 constitutes relatively simple and trouble-free means for insuring that each pocket will contain only a single washer when the pocket reaches the assembly station 27.

Even though the shoe 78 and the agitator fingers 86 promote good placement of the washers 22 in the pockets 26, there still is a possibility that a pocket may arrive at the assembly station 27 without a washer. If a screw blank 21 from one of the heads 31 of the turret 30 is ejected into the washerless pocket, the blank would proceed to the thread rolling machine without a washer. To guard against this possibility, the absence of a washer in any given pocket is detected and, when the pocket is empty, the delivery of a screw blank 21 from the rails 32 to the corresponding head 31 of the turret 30 is inhibited so that the head also is empty when the head registers with the washerless pocket at the assembly station 27.

More particularly, the absence of a washer 22 in a pocket 26 is detected by a sensor which herein is in the form of a radio frequency detector 105 (FIG. 1 and FIGS. 11 to 13) located at the twelve o'clock position on the disc 25. The detector includes a probe head 106 whose face is spaced a predetermined instance above a washer 22 in the disc. The detector is mounted for selective vertical adjustment on a bracket 107 which is secured to and extends laterally from a pin 108. The pin is rotatably supported by a second bracket 109 which is mounted for selective adjustment on the frame 35. A contractile spring 110 acts between the bracket 109 and an arm 111 on the outer end of the pin 108 and urges the bracket 107 and the detector 105 clockwise (FIG. 12) to a normal position where the probe head 106 is positioned directly above the outer periphery of the disc 25. A screw 112 (FIG. 11) on the bracket 107 engages a stop 113 on the bracket 109 to hold the detector in its normal position against the action of the spring 110. If washers should happen to jam beneath the probe head, the spring yields to allow the detector to swing upwardly and thereby prevent the head from being damaged. In addition, the detector may be swung counterclockwise to a generally horizontal inactive position shown in FIG. 13 to permit the detector to be serviced, adjusted or replaced. The spring 110 crosses over center as the detector is swung to its inactive position and thereafter tends to hold the detector in that position.

As long as a washer 22 is present in each pocket 26, the radio frequency detector 105 produces a "present" signal and the machine 20 continues to operate in a normal manner. If a pocket at the twelve o'clock position of the disc 25 is empty, however, the detector produces an "absent" signal. That signal serves to trigger means for preventing a screw blank 21 from being delivered from the rails 32 to the head 31 at the twelve o'clock position of the turret 30. Herein, these means comprise a pneumatic actuator 115 (FIGS. 1 and 14) attached to a bracket 116 on the rails and having a reciprocating rod 117 adapted to effectively close off the forward end of the rails when the rod is advanced. The rod normally is retracted as shown in FIG. 1 but is advanced automatically in response to an "absent" signal from the detector 105. When advanced, the rod presses the leading screw blank against the opposing rail as shown in FIG. 14 and prevents that screw blank from leaving the rails. Thus, the head 31 at the twelve o'clock position of the turret 30 does not receive a screw blank if there is a washerless pocket 26 at the twelve o'clock position of the disc 25. When the head and the pocket arrive at the assembly station 27, the head simply moves through an idle ejection stroke.

As a final safeguard, means are provided for ejecting the washer 22 from any pocket 26 which passes the assembly station 27 without a screw blank 21 being telescoped into the washers. These means comprise a nozzle 120 (FIG. 1) similar to the nozzle 92 and located between the assembly station 27 and the upstream end of the shoe 78. The nozzle 120 is directed downwardly and outwardly across the outer periphery of the disc 25 and receives pressurized air from a line 121. If a washer remains in a pocket 26 after passing the assembly station, the air jet from the nozzle 120 blows the washer out of the pocket and into a catch tray 123. This insures against the presence of an unused washer which might slide just part way out of the pocket 26 and then jam against the upstream end of the shoe 78 as the pocket approaches the shoe.

I claim:

1. A machine for assembling male fastener blanks with washers, said machine comprising a support, a reservoir on said support for containing a supply of washers, a disc mounted rotatably on said support and having a plurality of pockets spaced angularly around its periphery, said disc defining the bottom of said reservoir, said reservoir having a substantially arcuate side wall located adjacent the outer periphery of said disc, means for rotating said disc to cause said pockets to move beneath said supply and pick up washers therefrom, power-operated delivery means selectively operable to cascade washers into said reservoir and on top of said disc to replenish said supply, and mechanism for telescoping male fastener blanks into the washers in said pockets, the improvement in said machine comprising, a substantially arcuate shoe removably secured to an inner side of said arcuate wall of said reservoir, a lower end portion of said shoe having a cam surface which is inclined downwardly and outwardly relative to, and is positioned in overhanging relationship with an outer peripheral portion of said disc and which engages a pile of washers positioned over said pockets in said supply to both shave off washers from an upper portion of said pile and turn such washers to positions disposed generally in the plane of said disc to prevent bunching of said washers and to promote entry of said washers into said pockets, means for detecting the approximate quantity of washers in said supply in said reservoir, and means responsive to said detecting means for activating said delivery means when the quantity of washers in said supply is low and for inactivating said delivery means when the quantity of washers in said supply is high.

2. A machine as defined in claim 1 in which said detecting means comprise a feeler disposed in said reservoir and engageable with the top of the washers in said supply, said feeler being mounted on said support to move in one direction when the overall height of said support decreases and to move in the opposite direction when the overall height of said supply increases.

3. A machine as defined in claim 2 in which said responsive means comprise means for sensing the position of said feeler and operable to produce a signal activating said delivery means in response to said feeler moving in said one direction to a first predetermined position and operable to produce a signal inactivating said delivery means in response to said feeler moving in said opposite direction to a second predetermined position.

4. A machine as defined in claim 3 in which said feeler is mounted on said support to turn between said positions, a member connected to said feeler and turnable in unison with said feeler, said responsive means comprising a proximity detector for sensing the position of said member.

5. A machine as defined in claim 1 in which the upper end portion of said shoe includes an upwardly and outwardly inclined cam surface which may be brought into active position by inverting said shoe relative to said arcuate side wall.

* * * * *